March 29, 1955   F. L. HOLFORD   2,704,941
POWER DRIVEN RECIPROCATING TOOL
Filed April 3, 1952   2 Sheets-Sheet 2

INVENTOR.
FRANK L. HOLFORD
BY Albert R. Gobrick
ATTORNEY

United States Patent Office 2,704,941
Patented Mar. 29, 1955

2,704,941

POWER DRIVEN RECIPROCATING TOOL

Frank L. Holford, Towson, Md., assignor to
The Black & Decker Manufacturing Co.

Application April 3, 1952, Serial No. 280,266

3 Claims. (Cl. 74—50)

The present invention relates to improvements in power driven reciprocating tools and particularly to improvements in portable cutting tools such as jig saws, files and the like.

In power driven jig saws and other devices wherein a reciprocating tool is used, unbalanced linear reactions arising from the reciprocation of elements in the actuating mechanism cause undesirable vibrations in the entire mechanism. In a tool which is not suitably counterbalanced dynamically, such vibration becomes marked at high operating rates and is particularly objectionable in a portable mechanism, such as a file or jig saw manipulated and applied to the work by hand, which may be operated at a stroke rate of 2000–4000 per minute. Hence tools have been devised with the reciprocating tool head counterbalanced by a linearly moving counterweight.

It is the general object of this invention to provide an improved portable electrically driven reciprocating tool. Another more particular object is the provision of an improved dynamically counterbalanced mechanism for converting rotary motion of a motor into the reciprocating motion of a toolhead, this mechanism having a simpler, more compact structure than others hitherto used. A further object is the provision in a tool of the type described of means for removing cuttings or chips from the working area. Other objects and advantages of the invention will appear in the following description of the invention as embodied in a portable jig saw and in the drawings wherein—

Figure 1:
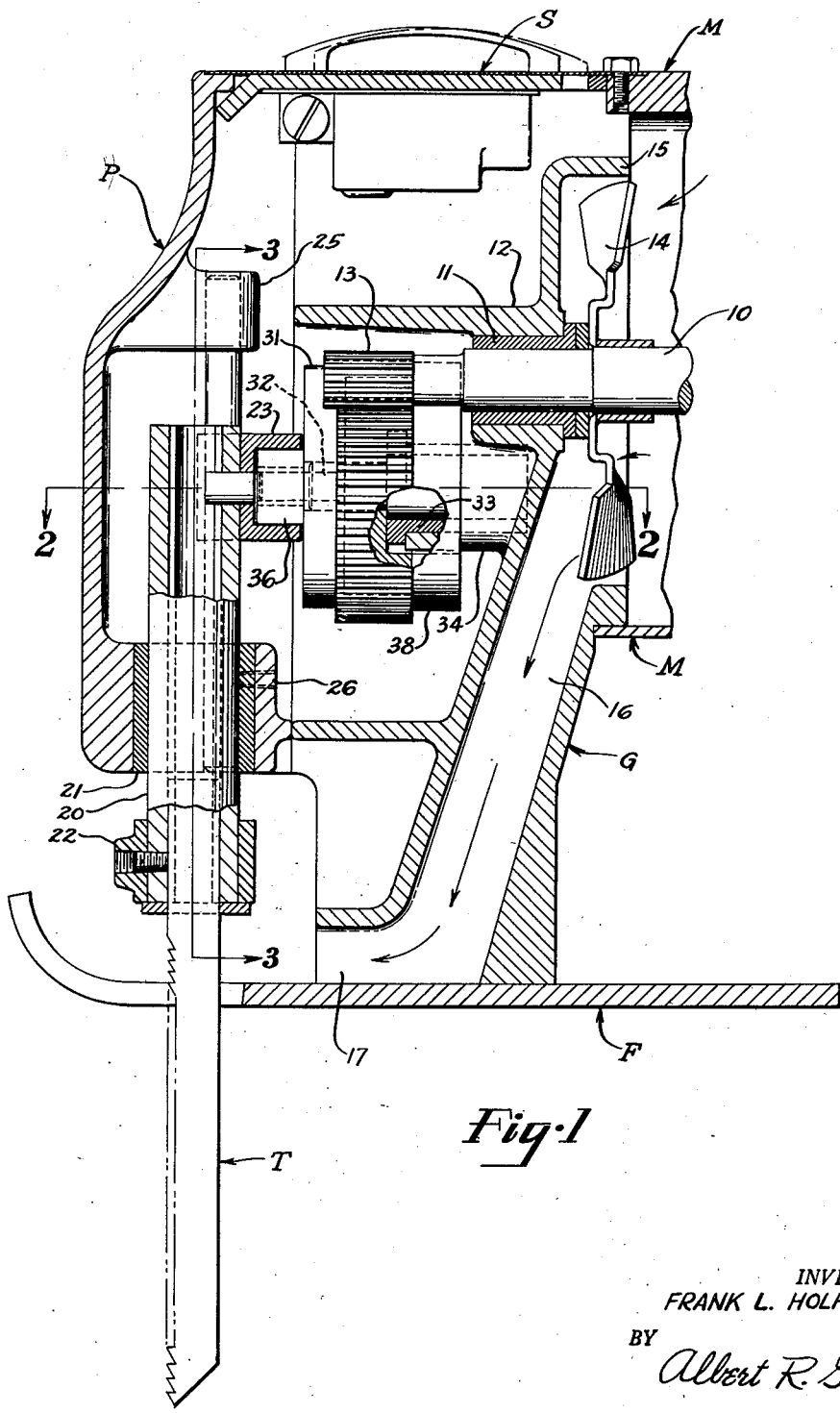
Fig. 1 is a vertical, longitudinal section through the tool, taken along the line 1—1 in Figure 2.
Figure 2:
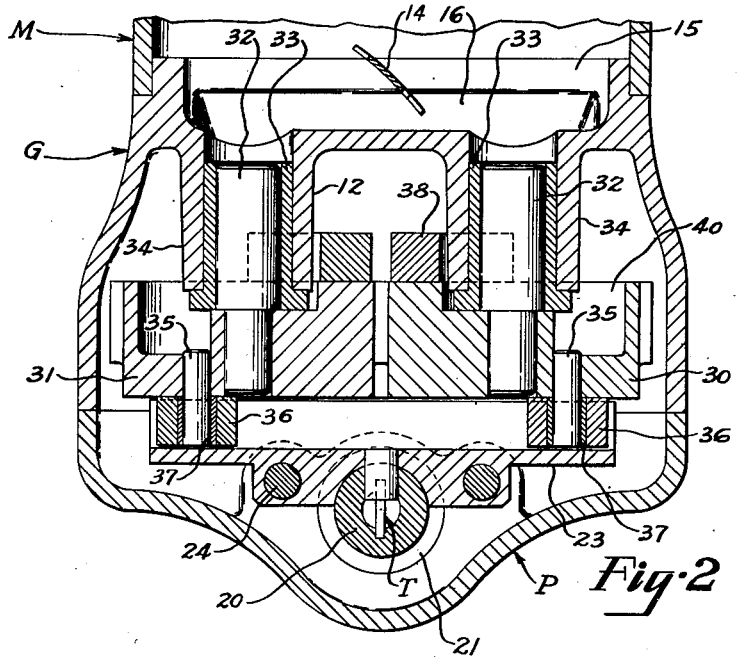
Fig. 2 is a horizontal section, taken along the line 2—2 of Fig. 1, through the actuating mechanism of the tool.
Figure 3:
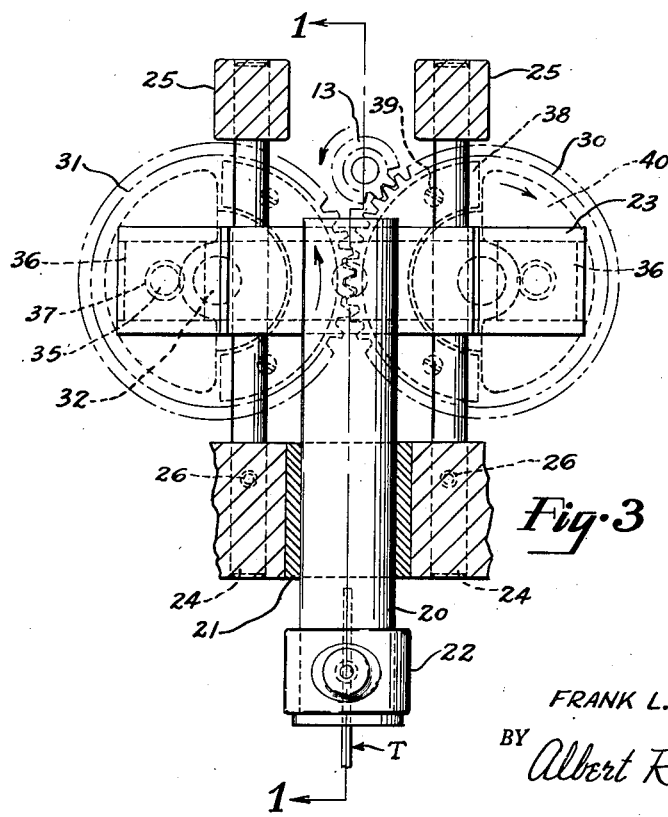
Fig. 3 is a fragmentary section taken vertically along the line 3—3 of Fig. 1 to show more clearly the elements of the actuating mechanism.

The invention is shown in the drawings as embodied in a portable electrically driven jig saw, the general organization of which, best seen in Fig. 1, comprises as major components (designated by letters used as general reference characters) a gear casing G interiorly mounting driving gear elements, a cover plate P mounting a sliding toolhead for the saw tool blade T, a motor unit M (only a portion of which is shown in the drawings), a sliding foot or base F through a slot or perforation of which the tool T extends and to which the gear casing is secured by screws or other suitable means, and a switch S for controlling the motor of the unit M. The rearwardly extending motor unit M serves as a handle for manipulating the tool as it is moved across the surface of a work piece supported by the planular foot F resting thereon. The forward end of the foot F is curved upward for easy advancement of the tool across rough surfaces, and the foot may also be provided with bearing means behind tool T to prevent rearward deflection. The gear casing G with integrally formed air conduit, fan housing and gear supporting internal web members, which are hereinafter described, may be produced as a die casting suitably machined for the reception of other elements of the mechanism. The cover plate and motor unit casing may be similarly formed.

The armature shaft 10 of the electric motor of the motor unit M extends into the gear casing and is journaled in a bushing 11 press fitted in a suitable aperture in a transverse web structure 12 of the gear casing, the end of the shaft being provided with a pinion 13 which may be integrally formed thereon. Also on the shaft 10 there is mounted a fan 14 disposed within a circular enclosure 15 formed in the casing G from the bottom portion of which an air channel 16 in the gear casing leads downwardly to a discharge opening 17 adjacent to foot F directing an air blast from the fan to sweep saw cuttings forwardly away from the saw T during operation. The fan also serves as a motor cooling fan since it draws air past the motor elements from inlets near the end of the motor unit casing. The gear casing cover plate P, which is secured by suitable means to the casing G, carries a reciprocating toolhead assembly comprising the rod shaped head 20 sliding in bushing 21 and bearing at its lower end a tool clamping means 22 and its upper end a transverse channel-shaped yoke 23, disposed at right angles to the head and held thereon by a pin, screw or other means. A pair of guide rods 24, disposed on opposite sides of the sliding head 20 and parallel thereto, have the upper ends inserted in the apertured lugs 25 formed in the interior of the cover plate and the lower ends held in apertures in the bottom of the cover plate by set-screws 26. These guide rods extend through apertures in the yoke 23 to provide means whereby the yoke and hence the tool head 20 with attached tool are prevented from turning and tilting.

A pair of identical meshing gear wheels 30 and 31, mounted on parallel shafts 32 journaled in bushings 33 pressed into the bores of the tubular extensions or posts 34 on the transverse gear case webbing 12, are driven by the motor shaft pinion 13 meshing with the wheel 30. The plane of the axes of the wheels 30 and 31 is disposed generally parallel to the extent of the foot F and the axis of the tool head 20 is disposed in a vertical plane passed midway between the wheel axes and perpendicular to the plane thereof. The vertical plane is a longitudinal plane of symmetry for the tool, except for the disposition of the motor with its shaft displaced to one side toward wheel 30.

Each gear wheel bears an eccentric crank pin 35 journaled in a bearing block 36 by bushing 37, each block being disposed to slide within the channel of yoke member 23. The gear wheels 30 and 31 are rotationally disposed relative to each other so that the crank pins 35 pass simultaneously through the plane of the axes of the shafts 32 in the course of their rotation. Each gear wheel is provided on the end opposite the crank-pin with a counterbalancing weight 38 held thereon by screws 39, the center of gravity of each weight being disposed at a position 180° away from the corresponding crank pin. Further, on each wheel there is provided a recess 40 to compensate for the moment of the crank pin and bearing block or to increase the effective counterweight mass on each wheel. In the structure disclosed, the cover plate P with the slide rod 20, yoke 23 and guide rods 24, and the motor unit M comprising casing, motor, fan 14 and pinion 13 are readily secured in proper position as sub-assemblies to a main sub-assembly including the gear casing G, the gear wheels 30 and 31 with annexed parts and the foot F. In assembling the motor unit to the casing G, the switch leads from the motor circuit are drawn down outwardly through the opening provided in the top of the casing G for the reception of switch S, for more ready connection to the switch, which is thereafter secured in the said opening.

As is apparent from the structure thus described, upon rotation of the motor shaft, the wheels 30 and 31 are revolved in opposite directions, thereby simultaneously carrying the sliding blocks 36 on the crank pins in a manner to produce vertical components of motion of identical sense and value, which through the yoke 23 cause the sliding head 20 to move in a vertical direction with a linear simple harmonic motion. This simple harmonic motion of the tool head yoke and tool T induces a vertical reaction force in the entire assembly which at any given time is proportional to the linearly moving mass, the amplitude of the tool stroke, the square of the stroke frequency, and the sine of the angle of displacement of the crank pins from the horizontal plane through the wheel axes.

Since the counterbalance weights 38 are both moving with vertical components of motion which are also simply harmonic, of the same frequency but 180° out of phase relative to the movement of the sliding toolhead and yoke assembly, the vertical reaction components of the two weights (which are each proportional to the counterweight mass, the radius of gyration of its center of gravity about the wheel axis, the square of the angular velocity of the mass, and the sine of the angle of displacement from the horizontal plane) may be made to balance out the slide assembly reactions so that no vibration will result from the reciprocating motion of the tool head slide assembly. Inasmuch as the gear wheels with associated crank pins, bearing blocks and counterweights are identical, the horizontal reaction components of the rotating eccentric masses cancel out due to the opposite sense of rotation of the wheels and the described mutual relations of the counterweights thereon.

In the foregoing description the tool head 20 and yoke 23 are considered as constituting the reciprocating mass and the counterweights 38 are considered as the sole bodies whose moments are effective in counterbalancing the reciprocating reactions, the crank pin and bearing masses being considered as compensated by the recesses 40. Obviously as far as vertical reaction components are concerned the bearing blocks could be considered as part of the reciprocating mass, in which case the total effectively unbalanced wheel mass and radius of gyration on the heavy side of each wheel would then be treated as the counterweight in the above analysis.

I claim:

1. A portable electrically driven reciprocating tool comprising a casing including a main frame member and a cap member secured thereto; a cutting tool mounting head reciprocably mounted in the cap member of the casing; a yoke member within the cap member of the casing secured to said head to reciprocate therewith and having a slideway disposed perpendicularly to the direction of reciprocation of the tool head; a pair of yoke guide ways in the cap member disposed on either side of the tool head parallel to the direction of reciprocation thereof; a pair of meshing identical coplanar gear wheels mounted on shafts within the main frame member of the casing, the plane of said wheels being parallel to said yoke member and the axes thereof being equally spaced from and in a plane perpendicular to the direction of said driven member, each of said gear wheels having secured thereto eccentric means engaging the slideway of said yoke member and being counterweighted at a locus diametrically opposite said eccentric means, and said wheels being meshed in such relation that in rotation the said eccentric means pass simultaneously through the plane of the wheel axes; a web structure integral with the frame member of the casing for mounting the shafts of said gear wheels; and a drive shaft with a pinion thereon meshing with one of said gear wheels, the shaft being journalled in said web structure.

2. A portable electrically driven reciprocating tool of the character claimed in claim 1, wherein the guide ways constitute bars extending through said yoke member.

3. A portable electrically driven reciprocating tool of the character claimed in claim 1 in which the counterweights on said gears are located within the perimeters of said gears.

References Cited in the file of this patent

UNITED STATES PATENTS

| | | |
|---|---|---|
| 630,229 | Hoyt | Aug. 1, 1899 |
| 672,320 | Ford | Apr. 16, 1901 |
| 717,942 | Streich et al. | Jan. 6, 1903 |
| 2,451,374 | Bell | Oct. 12, 1948 |
| 2,548,411 | Vache | Apr. 10, 1951 |
| 2,595,464 | Kaufmann | May 6, 1952 |
| 2,639,737 | Forsberg | May 26, 1953 |

FOREIGN PATENTS

| | | |
|---|---|---|
| 520,490 | Germany | Mar. 11, 1931 |